(No Model.) 2 Sheets—Sheet 1.

H. A. PEDRICK.
AIR COMPRESSOR.

No. 544,548. Patented Aug. 13, 1895.

WITNESSES
Chas. Amon
Will. N. Barr

INVENTOR
Howard A. Pedrick
By his Attorneys (No Model.) 2 Sheets—Sheet 2.

H. A. PEDRICK.
AIR COMPRESSOR.

No. 544,548. Patented Aug. 13, 1895.

WITNESSES
Chas. Amon
Will H. Barr

INVENTOR
Howard A. Pedrick
By his Attorneys
Howson & Howson

UNITED STATES PATENT OFFICE.

HOWARD A. PEDRICK, OF PHILADELPHIA, PENNSYLVANIA, ASSIGNOR OF ONE-HALF TO WESTON J. HIBBS, OF SAME PLACE.

AIR-COMPRESSOR.

SPECIFICATION forming part of Letters Patent No. 544,548, dated August 13, 1895.

Application filed February 17, 1894. Serial No. 500,517. (No model.)

*To all whom it may concern:*

Be it known that I, HOWARD A. PEDRICK, a citizen of the United States, residing in Philadelphia, Pennsylvania, have invented certain Improvements in Air-Compressors, of which the following is a specification.

The main object of my invention is to so combine with an air-compressor automatic belt-shifting mechanism that when the pressure has reached a certain point the belt will be shifted from the fast to the loose pulley and when the pressure is reduced the belt will be shifted from the loose to the fast pulley.

A further object of my invention is to so construct the mechanism that a compound action is maintained.

Figure 1:
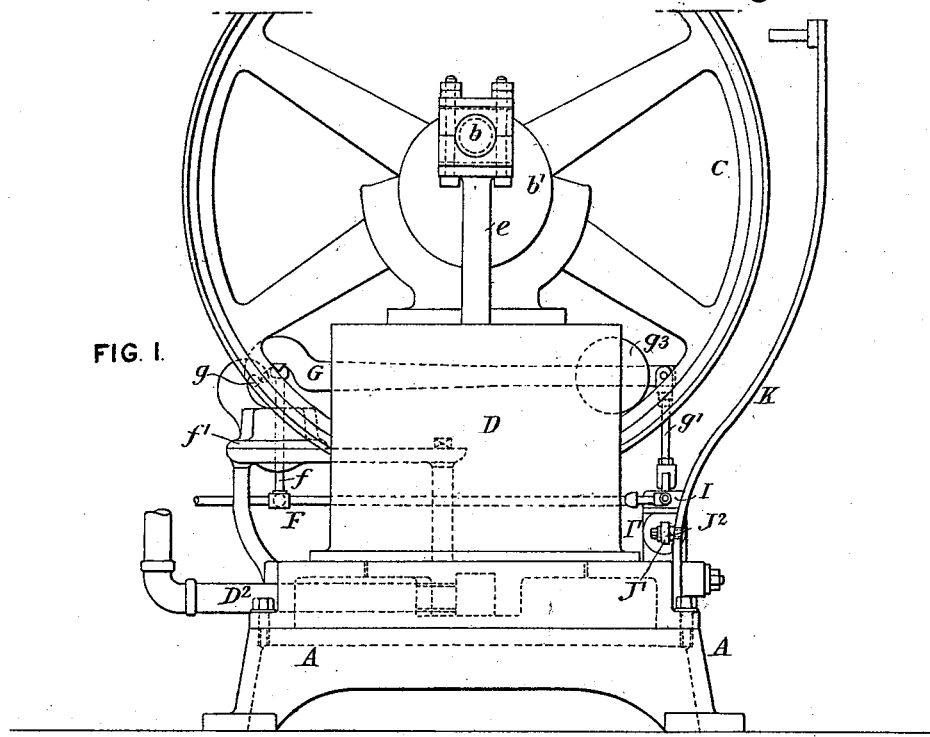
Figure 2:
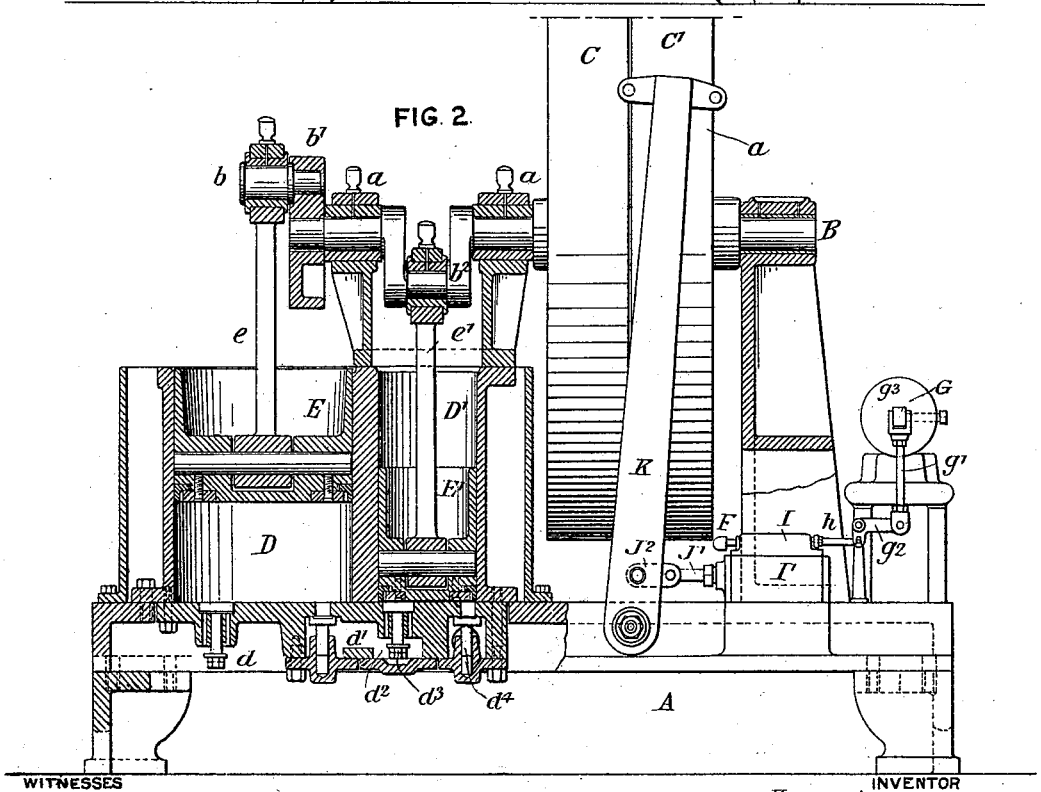
Figure 3:
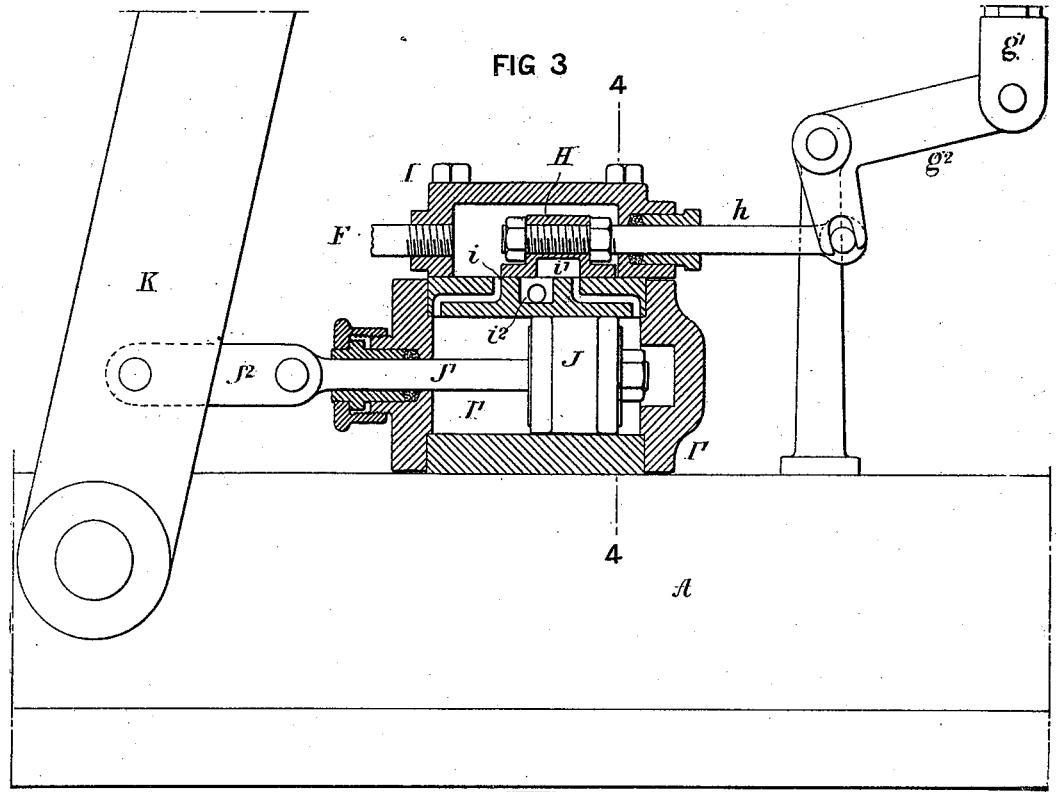
Figure 4:
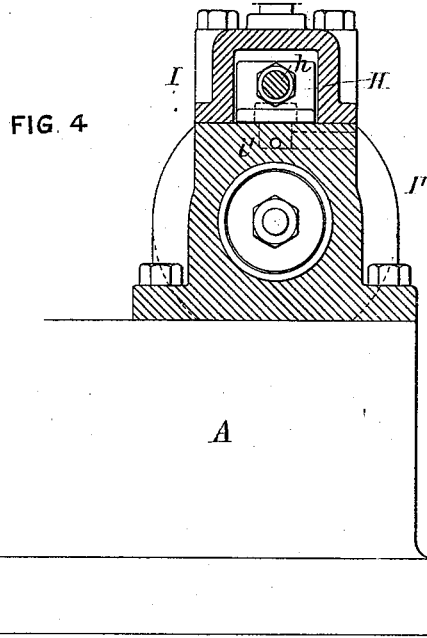

In the accompanying drawings, Figure 1 is an end view of my improved air-compressor. Fig. 2 is an end view, partly in section. Fig. 3 is a sectional view illustrating the shifting mechanism. Fig. 4 is a transverse section on the line 4 4, Fig. 3.

A is the base of the air-compressor.

B is the crank-shaft mounted in suitable bearings $a$.

D D' are the compressor-cylinders, the cylinder D' being somewhat smaller than the cylinder D. Working within the cylinder D is the piston E, connected to the crank-pin $b$ by a connecting-rod $e$, the crank-pin $b$ being mounted in the present instance on the disk $b'$, secured to the shaft. In the cylinder D' is the piston E', connected to the crank $b^2$ by a connecting-rod $e'$. The cranks are so adjusted that one cylinder is taking air while the other is discharging.

$d$ is the inlet-valve for the cylinder D and $d'$ is the exhaust-valve. $d^2$ is a passage connecting the exhaust-port of the cylinder D with the inlet-port of the cylinder D', as clearly shown in Fig. 2.

$d^3$ is the inlet-valve of the cylinder D', and $d^4$ is the outlet-valve for said cylinder.

$D^2$ is the discharge-pipe for the air under pressure. Connected to this pipe is a pipe F, which is in turn connected to a pipe $f$, communicating with the space under a diaphragm $f'$, which controls the action of a lever G, pivoted at $g$. The outer end of this lever is connected by a rod $g'$ to a bell-crank lever $g^2$, which in turn is connected to the valve-rod $h$ of the slide-valve H. On the lever G is a weight $g^3$, which can be adjusted to the amount of pressure required.

The slide-valve H, as shown clearly in Figs. 3 and 4, is adapted to slide within a box I, with which is connected the compressed-air pipe F, and in the seat are ports $i$ $i'$, communicating one with one end of the cylinder I' and the other with the opposite end of the said cylinder, and $i^2$ is the exhaust-port. Adapted to the cylinder I' is a piston J, having a piston-rod J' connected by a link J² to a belt-shifter K, so that when the parts are in the position shown in Fig. 3 the belt-shifter is in such a position that the belt is on the loose pulley C', but when the pressure is reduced the lever G is allowed to fall, shifting the valve H so as to exhaust the air in front of the piston J and allow air under pressure to gain access to the space back of the piston and move the belt-shifter so that the belt will be transferred from the loose to the fast pulley. Thus the air-compressor will be again set in motion until thrown out of action by the belt-shifting mechanism.

By the above-described construction it will be seen that the belt-shifter is entirely automatic, requiring very little attention after once set, and that by adjusting the weight on the lever G more or less pressure can be maintained, and by the arrangement of the cylinders of different diameters a short-stroke machine can be constructed, which will compress the air to the extent desired. In some instances the belt-pulley may be loose on the shaft and coupled thereto by a clutch, which can be thrown in and out of gear by the shifter. This construction can be used without departing from my invention.

I claim as my invention—

1. The combination of an air pump, a shaft for driving the same, devices for operatively connecting said shaft to or releasing it from a primary driving shaft, a main cylinder and piston for operating said devices in either direction, and an automatically controlled valve actuated by variations in the air pressure for admitting pressure to either end of the main cylinder, substantially as specified.

2. The combination of an air pump, a shaft for driving the same, devices for operatively connecting said shaft to or releasing it from a primary driving shaft, a main cylinder and piston for actuating said devices in either direction, and a valve for admitting pressure to either end of the main cylinder, said valve being adapted to be moved in one direction by the air pressure, and in the opposite direction by a weight, substantially as specified.

3. The combination of an air pump, a shaft for driving the same, devices for operatively connecting said shaft to or releasing it from a primary driving shaft, a main cylinder and piston for operating said devices in either direction, a valve for admitting pressure to either end of said cylinder, a flexible diaphragm actuated by pressure from the air pump, and connections whereby said diaphragm is caused to operate the valve for admitting pressure to said main cylinder, substantially as specified.

4. The combination of the compression cylinder and the power driven shaft connected to the piston of said compression cylinder, stopping and starting mechanism for said shaft, a plunger acted upon by the air pressure, a weighted lever acted upon by said plunger, a fluid actuated piston connected to the stopping and starting devices of the driving shaft, a valve serving to govern the flow of motive fluid which acts upon said piston, and an angular lever, one arm of which is connected to the valve stem, and the other arm to the weighted lever, substantially as specified.

In testimony whereof I have signed my name to this specification in the presence of two subscribing witnesses.

HOWARD A. PEDRICK.

Witnesses:
WILLIAM A. BARR,
FRANK E. BECHTOLD.